United States Patent [19]
Smith et al.

[11] Patent Number: 5,467,627
[45] Date of Patent: Nov. 21, 1995

[54] END FINISHER MACHINE

[75] Inventors: Kevin E. Smith; Kurtis J. Hoffman, both of Wauseon, Ohio

[73] Assignee: Wauseon Machine and Manufacturing, Inc., Wauseon, Ohio

[21] Appl. No.: 177,729

[22] Filed: Jan. 5, 1994

[51] Int. Cl.⁶ .................................................. B21H 1/06
[52] U.S. Cl. ......................................... 72/121; 72/125
[58] Field of Search ........................... 72/115, 117, 120, 72/121, 123, 125; 82/73; 470/75

[56]  References Cited

U.S. PATENT DOCUMENTS

| | | | |
|---|---|---|---|
| 3,772,945 | 11/1973 | Varga | 82/73 |
| 3,851,515 | 12/1974 | Hautau | 72/121 |
| 4,873,856 | 10/1989 | King | 72/121 |

OTHER PUBLICATIONS

Photographs of Series 1000 Shaver, manufactured by Wauseon Machine and Manufacturing, Inc., Wauseon, Ohio.

*Primary Examiner*—Lowell A. Larson
*Attorney, Agent, or Firm*—Emch, Schaffer, Schaub & Porcello

[57]  ABSTRACT

An end finisher machine is disclosed. A longitudinal base mounts a stabilizer block which in turn mounts a high speed shaft or spindle, the spindle extends through a head having a camming surface and mounts a tooling assembly at its distal end. A motor drives the spindle at high speeds. A workpiece is placed in a tool holder mounted on the base adjacent the head. A first drive cylinder moves the stabilizer block and the tooling assembly to a correct axial position adjacent the workpiece. A second drive cylinder moves the head to cam the tooling assembly to drive the tools to perform the desired tooling operation.

12 Claims, 9 Drawing Sheets

END FINISHER MACHINE

BACKGROUND OF THE INVENTION

The present invention relates to an end finisher machine and, more particularly to an end finisher machine for performing operations on workpieces, including tubes. Some of the end finishing operations which can be performed are rolling on beads on the workpieces and placing circumferential cuts in the workpieces, for examples cuts which can be used to receive O-rings. The tools which are used in the end finisher machines are known in the art and are normally either cutters or rollers.

Prior art end finisher machine are known in the art. One of the problems found in prior art machines is that the tooling is rotated at slower than desirable speeds. This often prevented the use of certain types of tools, including tools using diamond cutters. Other problems with prior art machines were the difficulty in holding tolerances on the end forming operations, including the difficulty of adjusting the tooling to meet precise tolerances.

It is the object of the present invention to provide an improved tube end finisher machine.

SUMMARY OF THE INVENTION

The improved end finisher machine, according to the present invention provides a machine which rotates the tools at a very high speed, allowing fast production capabilities and the use of diamond cutter tools and tools which include other exotic materials. The present end finisher machine includes a longitudinally extending base which defines an upper guide rail or slide. A workpiece holder is positioned adjacent one end of the guide rail and a stabilizing block assembly is mounted on the guide rail adjacent the other end. The stabilizing block assembly includes a shaft bearing assembly which rotably mounts a shaft or spindle which extends toward the workpiece holder. A motor is positioned adjacent the stabilizing block for rotating the shaft. A head assembly is mounted along the shaft for axial movement relative to the shaft. The head assembly defines an opening in one end and a tooling assembly is mounted on the shaft adjacent the head assembly opening. The head assembly is an important feature of the invention. The head assembly and the tooling assembly define mating camming surfaces wherein axial movement of the head assembly relative to the tooling assembly opens and closes the tooling assembly.

A first bearing assembly which mounts the stabilizing block assembly is positioned for movement on the guide rail. A first cylinder means is operatively connected to the stabilizing block assembly. A second bearing assembly is also mounted for movement along the guide rail. The second bearing assembly mounts the head assembly. The first cylinder means initially moves both the stabilizing block assembly and the head assembly. A second cylinder means is operatively connected to the head assembly for separatively moving the head assembly relative to the shaft or spindle.

DESCRIPTION OF THE PREFERRED EMBODIMENT

Figure 1:
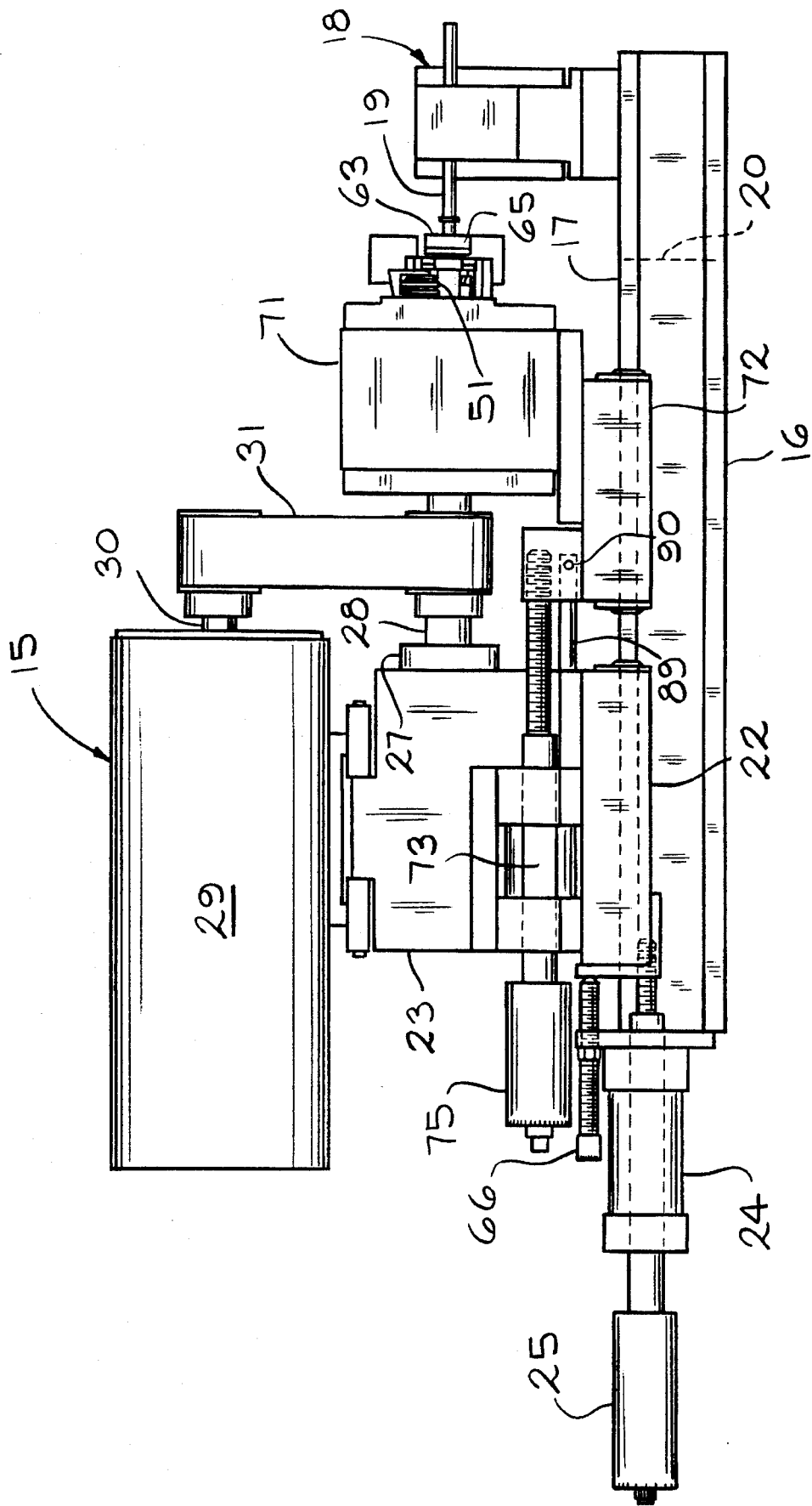
FIG. 1 is an elevational view of an end finisher machine, according to the present invention with a tube workpiece in the lockup position and positioned adjacent the flag stop.

Referring to FIG. 1, an end finisher machine, according to the present invention, is generally indicated by the reference number 15. The end finisher machine 15 includes a longitudinally extending base 16 having a guide slide or guide rail 17 defined adjacent its upper end. A workpiece holder 18 for receiving and holding a tubular workpiece 19 is mounted adjacent one end of the guide rail 17. A pass-through opening 20 is defined in the base 16 and allows the passage of completed workpieces 19 into a receiver (not shown) after the machining or forming operation is completed. A first bearing or saddle assembly 22 is mounted for movement on the guide rail 17 and mounts a stabilizing block assembly 23. A first cylinder means 24 is connected to the first bearing assembly 22. Extension and retraction of the first cylinder means 24 moves the first bearing assembly 22 and the attached stabilizing block 23 along the guide rail 17 of the base 16. An adjuster 25 is operatively connected to the first bearing assembly 22 for precisely adjusting the overall position of the stabilizing block assembly and its connected components to accurately position the tooling axially relative to the workpiece.

Figure 4:
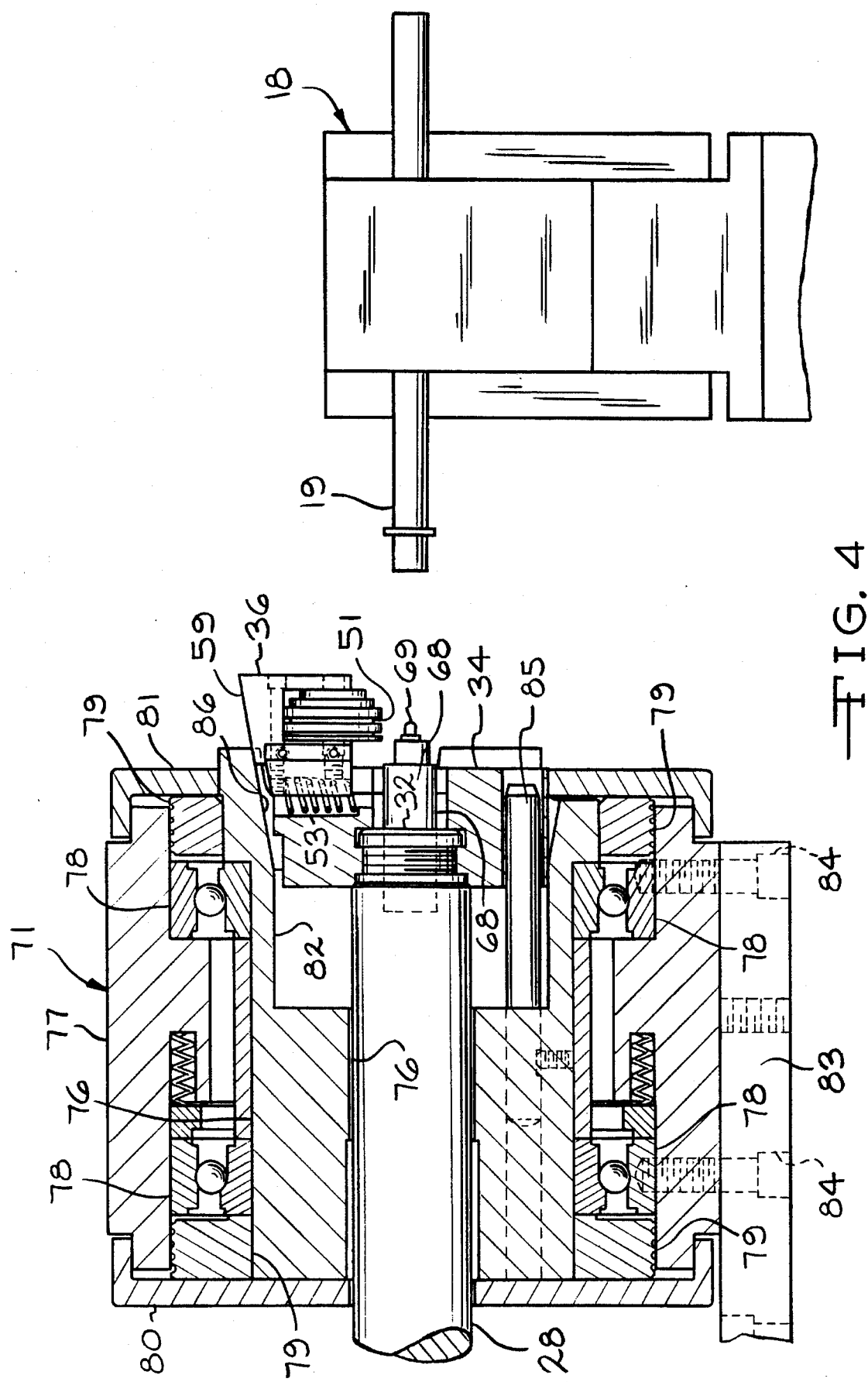
FIG. 4 is an enlarged sectional view showing the head assembly and the workpiece holder in the FIG. 1 position.
Figure 8:
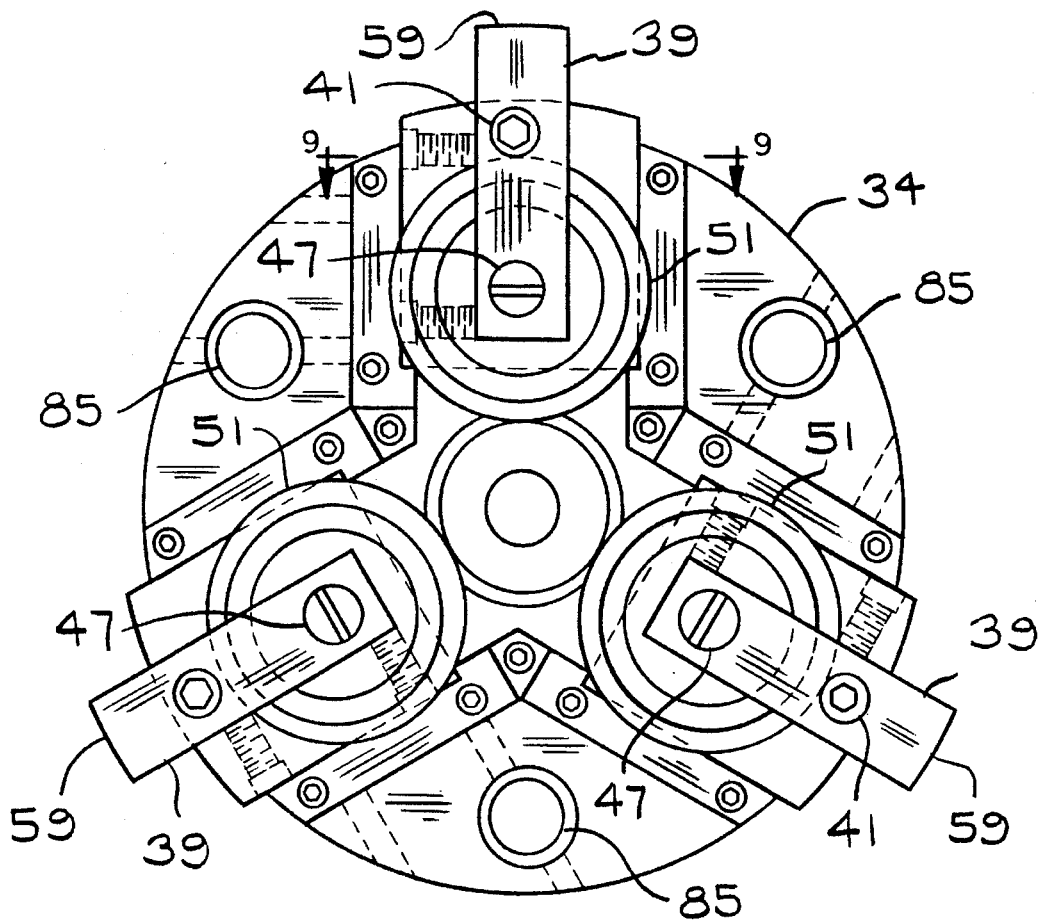
FIG. 8 is an end view of the tooling assembly with the tools in the retracted position of FIGS. 1 and 2.
Figure 9:
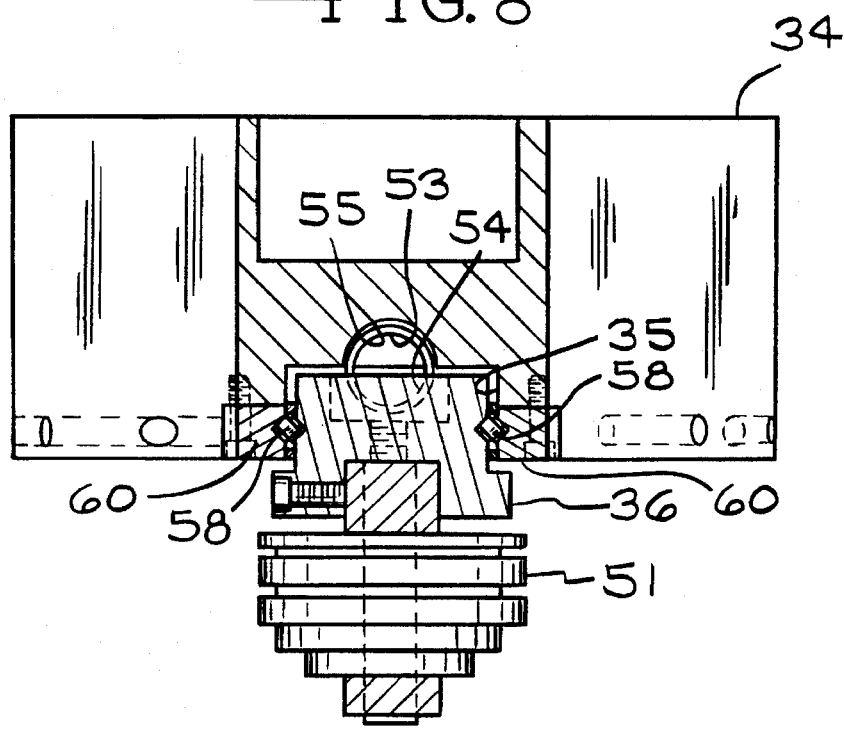
FIG. 9 is a fragmentary sectional view taken along the line 9—9 of FIG. 8.

The stabilizing block assembly 23 includes a shaft bearing assembly 27 which in turn mounts a rotatable spindle or shaft 28. A motor 29 is mounted adjacent the stabilizing block assembly 23 and includes an output shaft 30. A drive belt 31 extends between the output shaft 30 of the motor 29 and the main machine shaft 28, to drive the shaft 28. The motor 29 rotates the main spindle or shaft 28 at operating speeds between 200 RPM and 5000 RPM. The spindle or shaft 28 includes a distal end 32. Referring to FIG. 4, a tooling assembly including a generally cylindrical tooling shaft member 34 is threaded to the rotatable shaft 28. Referring to FIGS. 8 and 9, the tooling shaft member 34 defines a plurality of radial channels 35.

Figure 7:
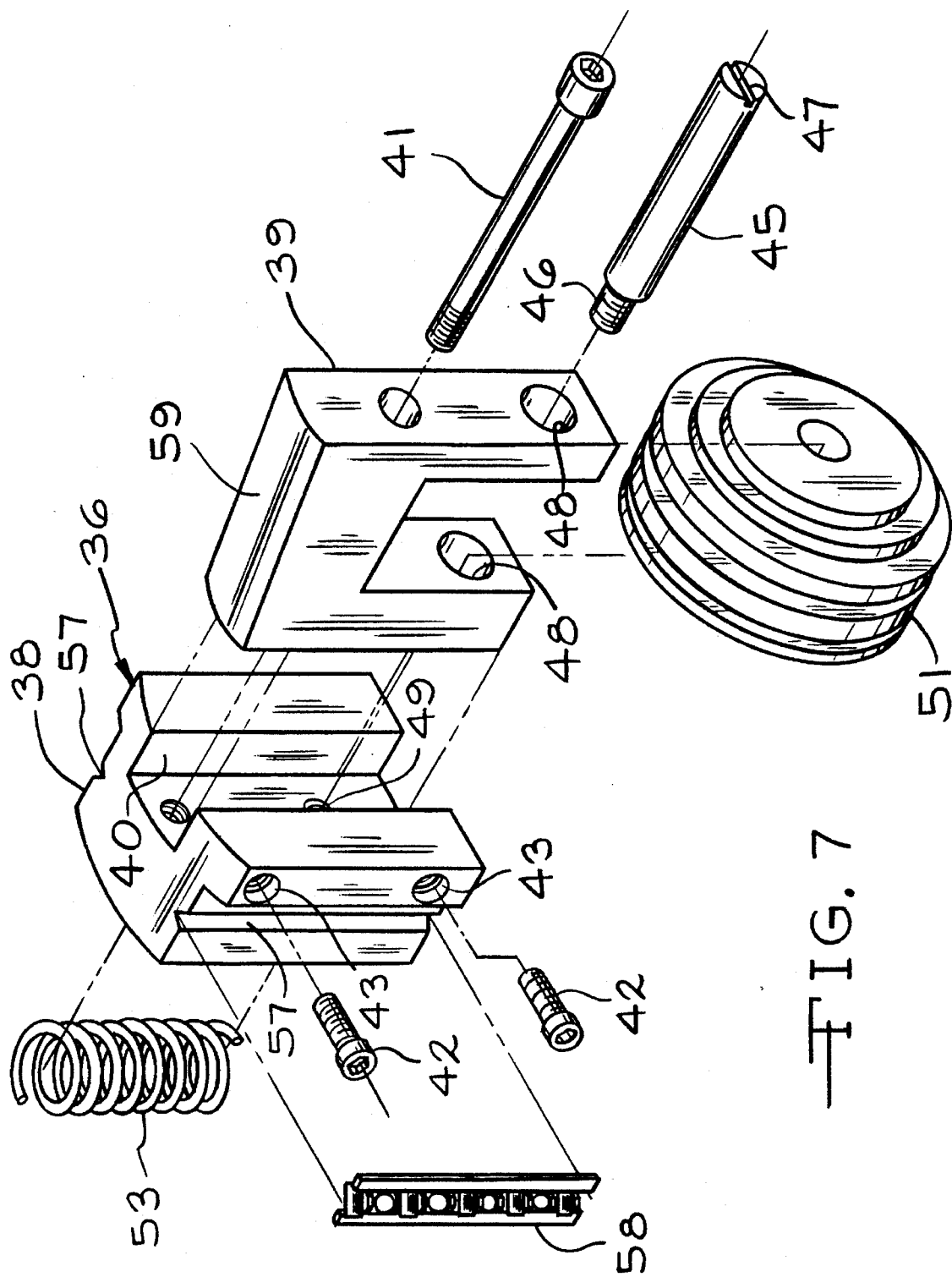
FIG. 7 is an exploded view of the tooling assembly, shown on an enlarged scale.

A plurality of tool holders 36 are mounted for radial movement on the tooling shaft member 34. Each of the tool holders 36 include a slide member 38 mounted for radial movement in one of the radial channels 35. The tool holders 36 also include a generally "U" shaped retaining member 39 which is positioned within a radial opening 40 defined in each of the tool holders 36. The retaining member 39 are secured to the slide member 38 by cap screws 41. Adjusting screws 42 extend through threaded openings 43 in the slide member 38 and engage the retaining member 39. The adjusting screws 42 serve to urge the retaining member 39 against the far side of the opening 40 of the slide member 38. A tool shaft 45 having a threaded end 46 and a slotted end 47 extends through opposed openings 48 in the legs of each retaining member 39. The threaded end 46 is received by a threaded opening 49 in the slide member 38. The tool shaft 45 serves as holding means for retaining a tool, for example the tool 51 illustrated in FIG. 7. Referring to FIGS. 7 and 9, a plurality of compression springs 53 are mounted between the tooling shaft member 34 and the tool holders 36 to urge the tool holders 36 radially outwardly. Each of the slide members 38 defines a recess 54 and the tooling shaft member 34 defines a plurality of mating recesses 55. The recesses 54 and 55 receive the springs 53. Referring to FIG. 7, the slide member 38 of the tool holders 36 defines a pair of opposed longitudinally extending "V" grooves 57 which receive longitudinal bearing assemblies 58. The longitudinal bearing assemblies 58 are positioned between gibs 60 and the tool holders 36 (see FIG. 9) to ensure smooth radial movement of the tool holders 36. A camming surface 59 is provided on the outer end of each retaining member 39 of each tool holder 36.

Figure 2:
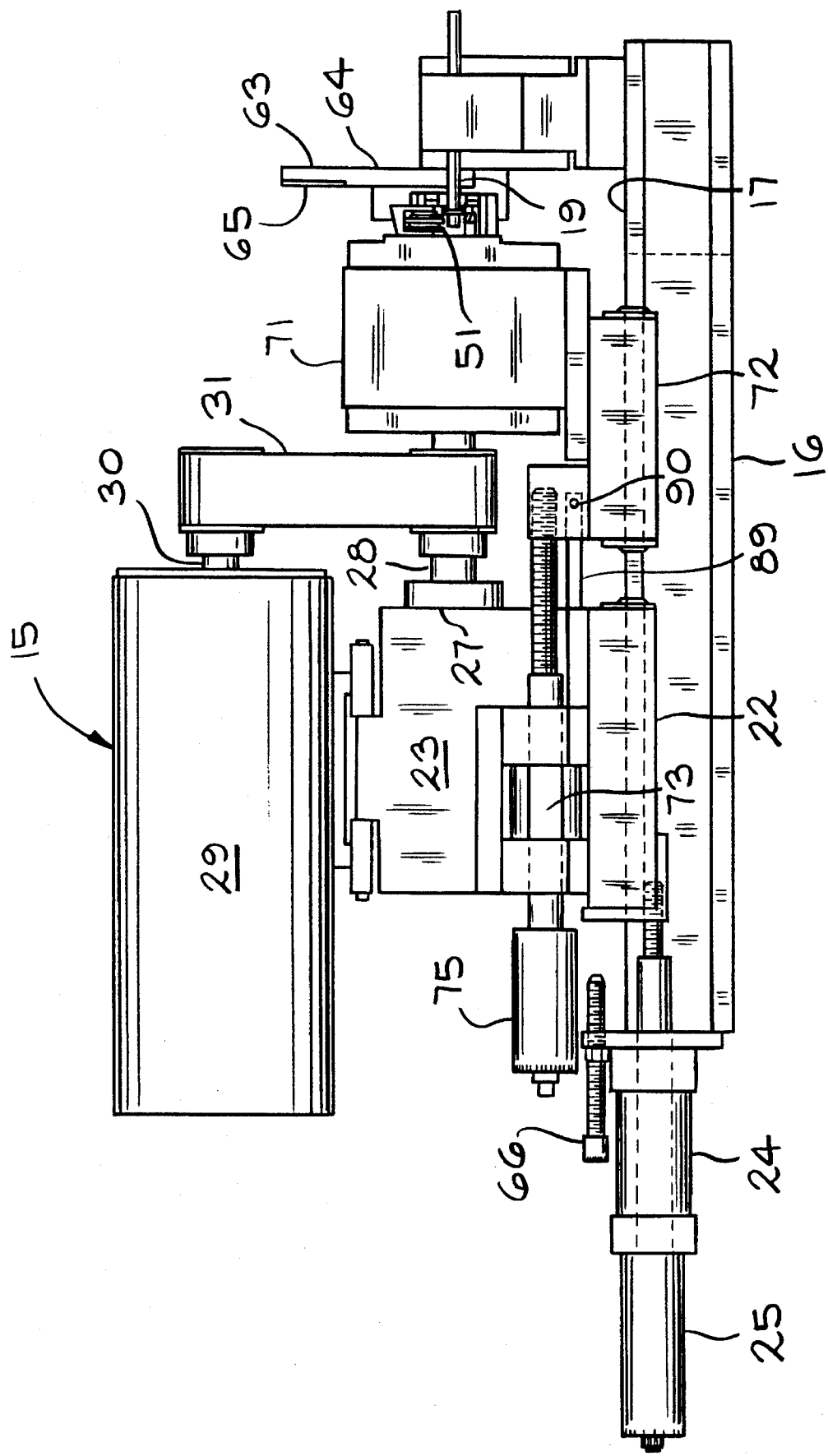
FIG. 2 is a view similar to FIG. 1 after the flag stop has been moved upwardly and the first cylinder means extended to position the tools over the tube workpiece.
Figure 3:
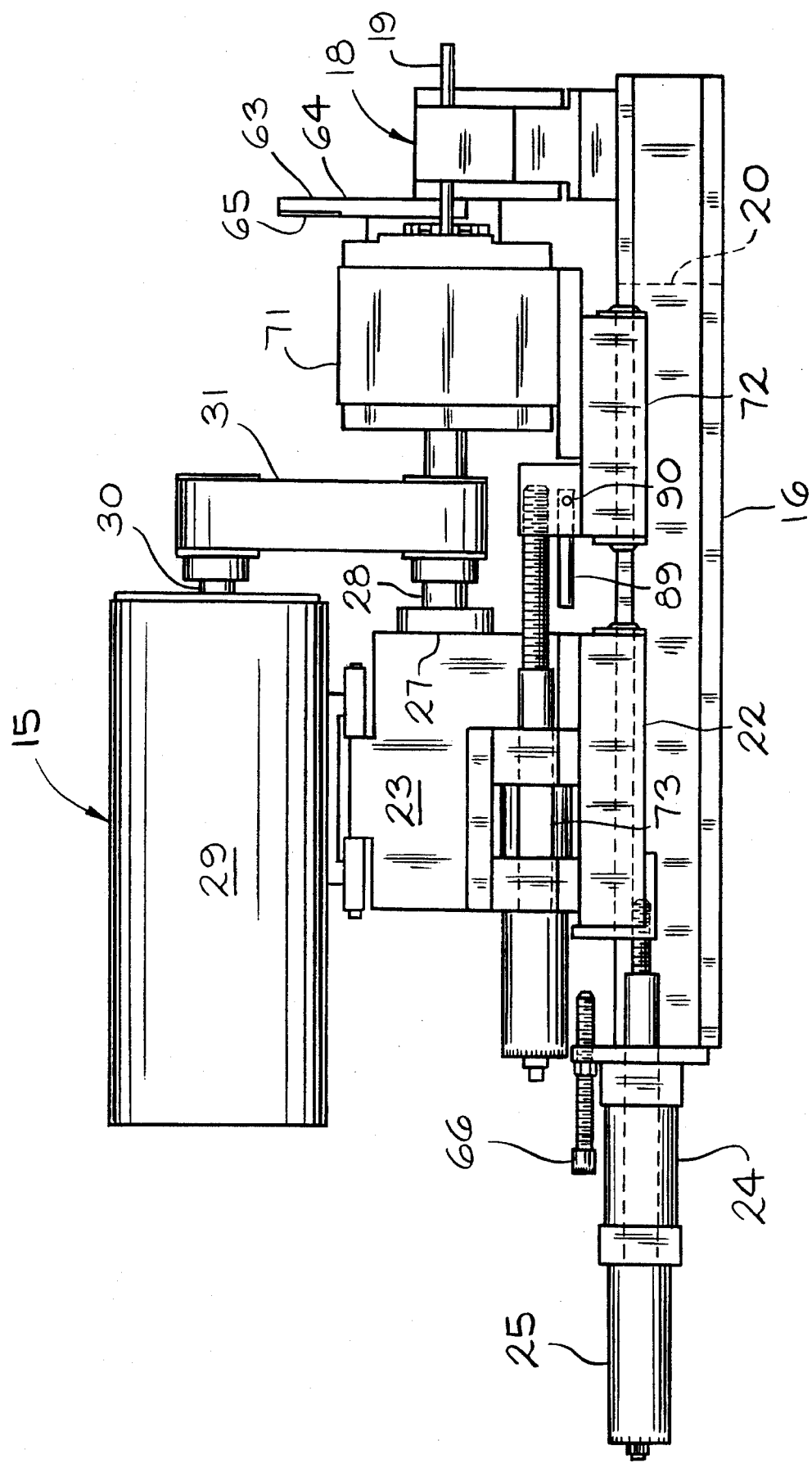
FIG. 3 is a view similar to FIG. 1 after the second cylinder means has been extended to cam the tools downwardly upon the workpiece.

Referring to FIGS. 1, 2 and 3, a flag stop assembly 63 is mounted adjacent the workpiece holder 18. The flag stop assembly 63 includes a pivotal arm 64 and a stop gauge 65 positioned at the outer end of the arm 64. Initially, the flag stop assembly 63 is moved to its operative position shown in FIG. 1 and the workpiece 19 is moved either manually or automatically into position against the stop gauge 65. The arm 64 is then swung upwardly to the FIG. 3 position and the cutting or roll forming operation is performed. Referring to FIG. 1, a flag stop assembly adjuster 66 is provided to ensure that the stop gauge 65 is in a precise axial position prior to the time that the first workpiece 19 is moved against the stop gauge 65.

Referring to FIG. 4, a live center 68 having a protruding pilot 69 at its outer end is mounted adjacent the distal end 32 of the shaft 28. The pilot 69 is positioned within the workpiece 19. The live center 68 supports the workpiece 19 during any cutting or forming operation on the workpieces 19.

Referring to FIGS. 1 and 4, a head assembly 71 is mounted by a second saddle or bearing assembly 72 adjacent the distal end 32 of the spindle or shaft 28. A second cylinder means 73 is connected to the second bearing assembly 72. Extension and retraction of the cylinder 73 moves the head assembly 71 axially relative to the shaft 28. An adjuster 75 is operatively connected to the second bearing assembly 72 for moving the head assembly 71 to a desired precise axial position relative to the shaft 28.

The adjusters 25, 66 and 75 are normally utilized during initial setup of the end finisher machine 15. In the present embodiment, the adjusters 25, 66 and 75 are illustrated as manual adjusters. In the most preferred embodiment, the adjusters are operated electronically through micro processors and servo mechanisms or other well known prior art devices (not shown).

Referring to FIG. 4, the head assembly 71 includes a generally cylindrical central member 76 and an outer member 77. Bearings 78 are positioned between the central member 76 and the outer member 77. Labyrinth seals 79 are also provided between the central member 76 and the outer member 77. End plates 80 and 81 are provided at the ends of the head assembly 71. The head assembly 71 defines an opening 82 adjacent the distal end 32 of the shaft 28. The tooling assembly including the tooling shaft member 34, the slide members 38 and the retaining members 39 are positioned within the opening 82 defined by the head assembly 71. The central member 76 rotates with the shaft 28 while the outer member 77 of the head assembly 71 is operatively connected to the second bearing assembly 72 through a structural plate 83. The plate 83 is attached to the second bearing assembly 72. The structural plate 83 is connected to the outer member 77 by set screws 84, as indicated in FIG. 4. A plurality of drive pins 85 extend between the central member 76 of the head assembly 71 and the tooling shaft member 34 of the tooling assembly.

The central member 76 of the head assembly 71 defines an inner mating camming surface 86 which mates with the camming surfaces 59 defined by the retaining members 39 of the tool holders 36.

Referring to the drawings, in a typical operation, a workpiece 19 is loaded either manually or automatically and locked into the workpiece holder 18. The workpiece is then positioned against the stop gauge 65 of the flag stop assembly 63. This position is shown in FIG. 1. Prior to this time any fine adjustments of the positioning of the stop gauge 65 have already been made by rotating the flag stop assembly adjuster 66.

The motor 29 has been activated and the shaft 28 carrying the tooling shaft assembly is rotating at its desired high speed. The flag stop assembly 63 is pivoted out of position and the first cylinder member 24 actuated. The cylinder 24 is extended and drives the saddles or bearing assemblies 22 and 72 forward to axially position the tools 51 over the end of the tubular workpiece 19. This position is shown in FIG. 2. Actuation of the first cylinder means 24 has moved the major components of the end finisher machine 15 to the right, as shown in FIG. 2. These components include the stabilizing block 23, the motor 29, the shaft 28 and the head assembly 71.

The FIG. 4 embodiment is the same machine position as the FIG. 1 illustration, with the exception that the flag stop assembly 63 has been removed for clarity.

Figure 5:
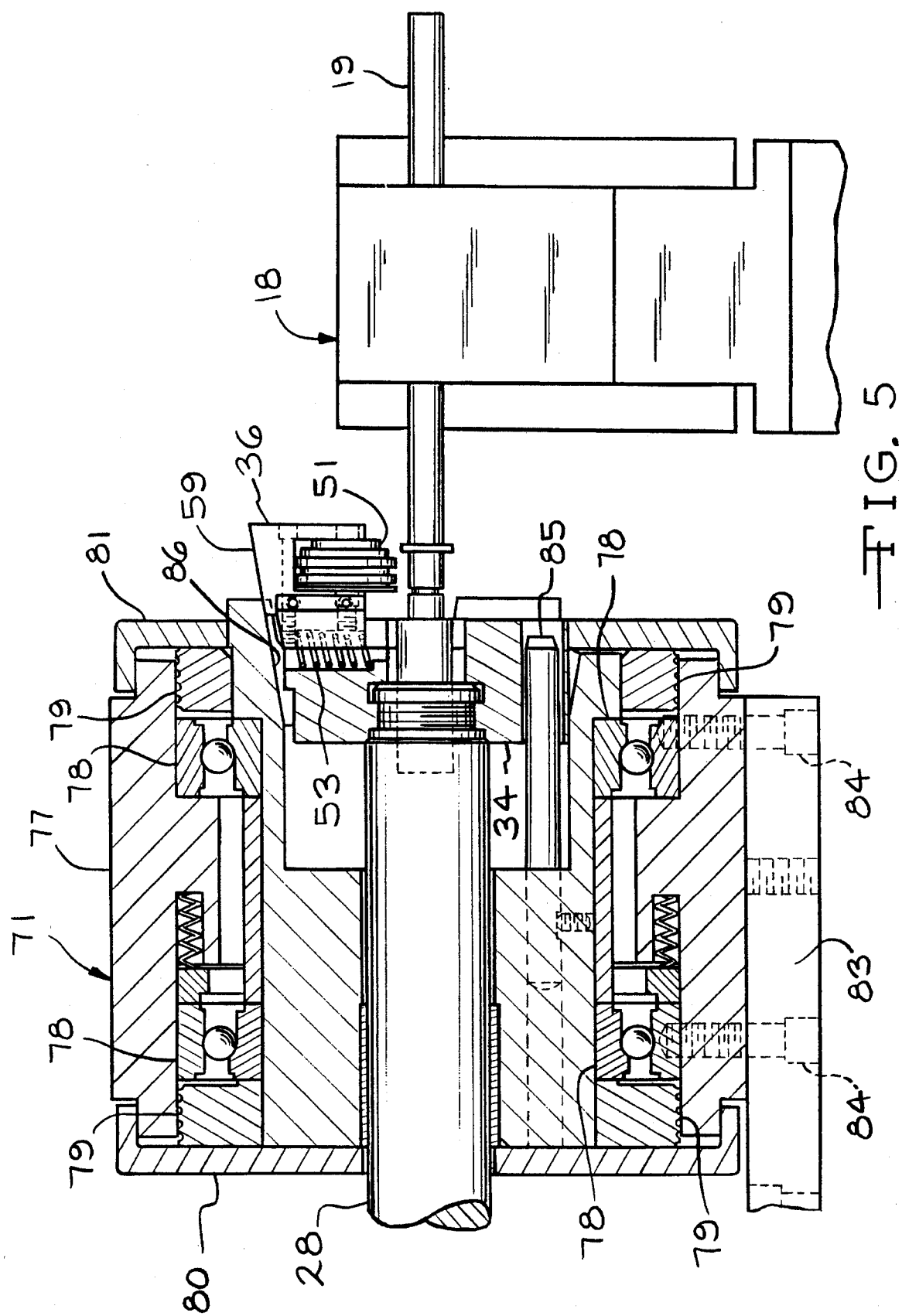
FIG. 5 is a view similar to FIG. 4 showing the head assembly in the FIG. 2 location after the tools have been moved to a precise position relative to the tube workpiece.

The FIG. 5 illustration shows the end finisher machine 15 in the FIG. 2 position where the tools 51 are correctly positioned relative to the end of the workpiece 19. In this position (see FIG. 5), the springs 53 hold the tool holders 36 and the tools 51 in their outer non-engaged radial positions.

Figure 6:
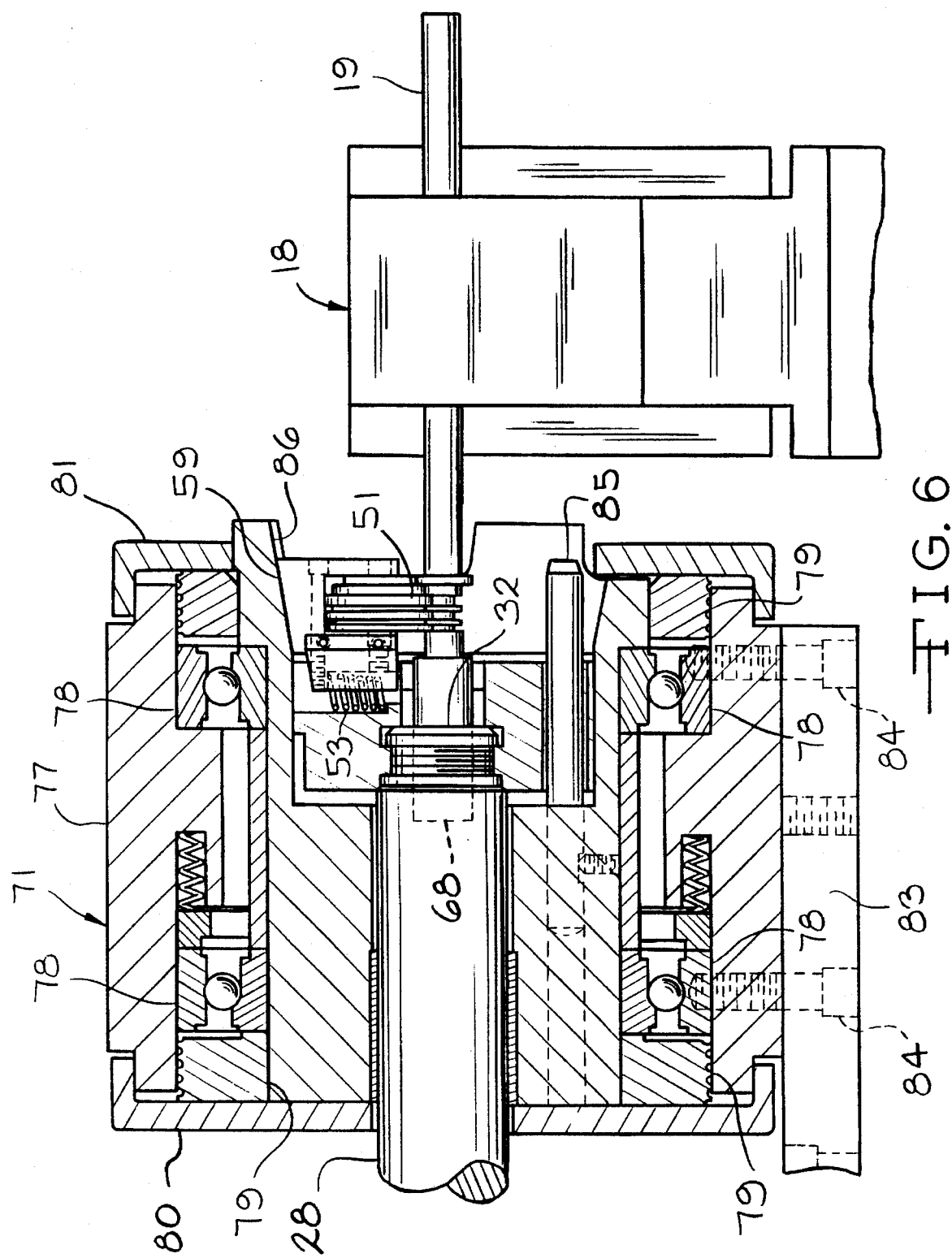
FIG. 6 is a view similar to FIG. 4 showing the head assembly and the workpiece holder in the FIG. 3 position where the tools have been cammed downwardly to perform the desired operation.

To move the tools 51 radially inwardly to perform the desired end finishing operation, the second cylinder means 73 is activated. This axially moves the head assembly 71 along the rotating shaft 28. In the FIG. 2 and FIG. 5 position, the camming surface 86 of the head assembly 71 is positioned correctly adjacent the mating camming surfaces 59 of the tool holder assembly. Upon extension of the second cylinder means 73, the camming surface 86 drives the tools 51 radially inwardly against the compression springs 53 to perform the desired tooling operation, as shown in FIG. 6. The cylinders 24 and 73 are then moved to their original retracted positions and the tooling acting under the bias of the springs 53 are moved radially outwardly to the FIG. 8 position. At this time the finished workpiece 19 is removed from the work holder 18 by, for example dropping downwardly through the pass-through opening 20 in the base 16. The above described sequence of operations is then performed on the next workpiece 19.

Figure 10:
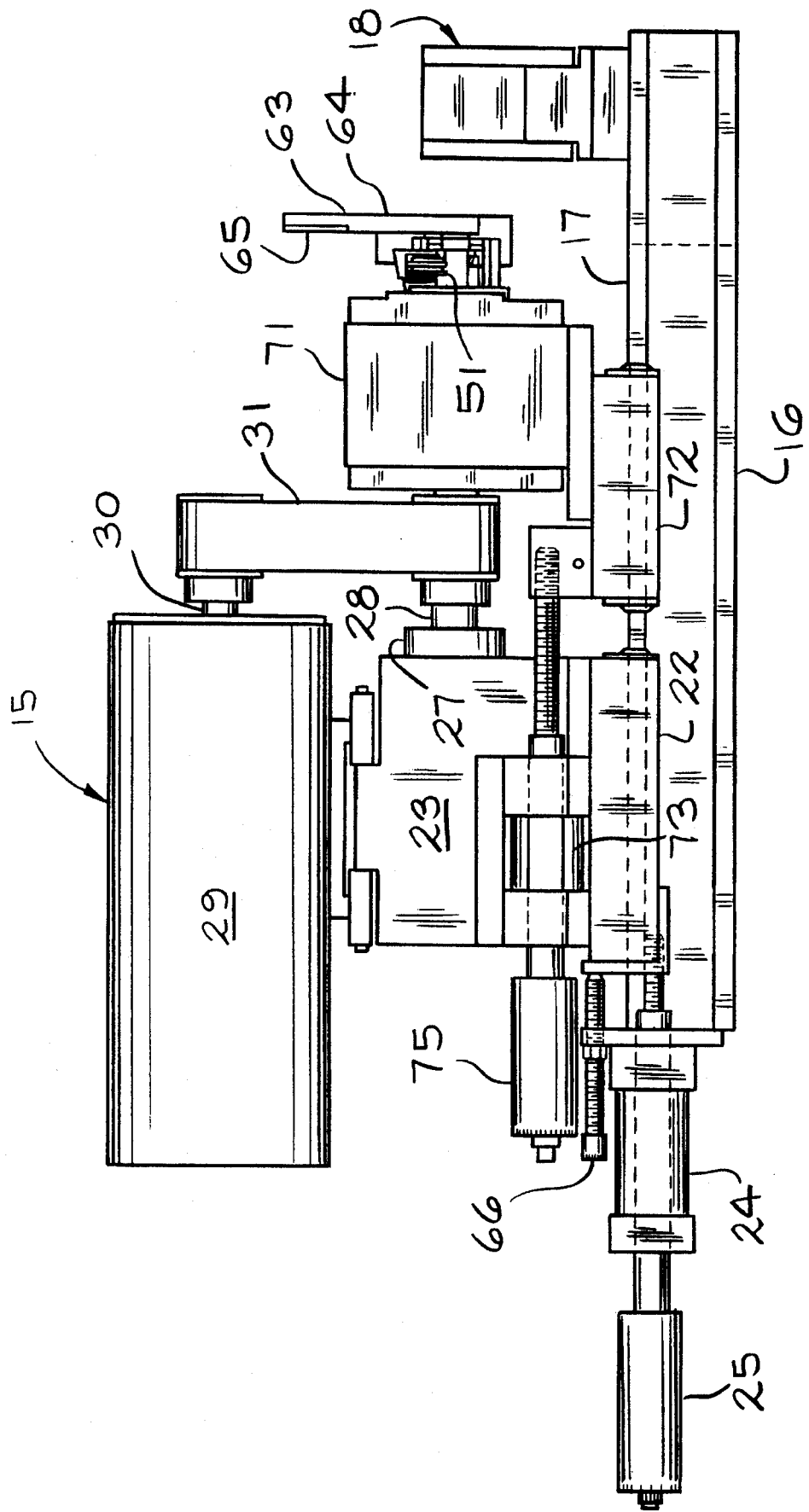
FIG. 10 is an elevational view, similar to FIG. 1, showing the end finisher machine in a tool changing mode.

One of the problems in some prior art machines is that it is very difficult to change tooling. In the present embodiment, the procedure is simplified. Referring to FIG. 3, there is a lock rod 89 pinned to the second bearing assembly 72 by a pin 90. To remove the tooling, after the motor has been moved to the off position, the pin 90 is removed. This allows the lock rod 89 to be removed and the head assembly 71 is manually moved to the left, as shown in FIG. 10. This allows an operator to manually change the tooling simply by removing the tool shafts 45 (see FIG. 7) and replacing the tool 51 with another desired tool.

Many revisions may be made to the above described embodiment without departing from the scope of the invention or from the following claims.

We claim:

1. An end finisher machine comprising a longitudinally extending base, a workpiece holder mounted on said base, a stabilizing block assembly mounted on said base, a rotatable shaft extending from said block assembly toward said workpiece holder, a head assembly surrounding said shaft for movement along said shaft, said head assembly defining an opening at one end, a tooling assembly mounted on said shaft within said head assembly opening, said head assembly and said tooling assembly defining mating surfaces wherein longitudinal movement of said head assembly opens and closes said tooling assembly, a stop assembly mounted adjacent said workpiece holder, said stop assembly including a pivotal arm movable between a stop position for engaging a workpiece adjacent said tooling assembly and an outer position, motor means for rotating said shaft, first cylinder means for moving said stabilizing block assembly and said tooling assembly toward and away from said workpiece holder and second cylinder means for moving said head assembly and its mating surface toward and away from said mating surfaces of said tooling assembly, said tooling assembly including a tooling shaft member fixed to said shaft within said head assembly opening, a plurality of tool holders mounted for radial movement on said tooling shaft member, springs mounted between said tooling shaft member and said tool holders for urging said tool holders radially outwardly, and holding means on said tool holders for holding the tools.

2. An end finisher machine, according to claim 1, wherein said tooling shaft member defines a plurality of radial channels, each of said tool holders including a slide member mounted for radial movement in one of said plurality of radial channels, and a generally "U" shaped retaining member attached to said slide member, said holding means for retaining the tools comprising a tool shaft mounted by said retaining member.

3. An end finisher machine, according to claim 2, including a longitudinal bearing assembly between said tooling shaft member and each of said slide members.

4. An end finisher machine, according to claim 2, including adjusting means between each of said slide members and its respective retaining member for adjusting said tools.

5. An end finisher machine, according to claim 2, wherein each of said slide members defines a recess adjacent said tool shaft member, said recess receiving one of said springs.

6. An end finisher machine, according to claim 1, wherein said base defines an opening for receiving a completed workpiece.

7. An end finisher machine, according to claim 1, wherein said motor means rotates said shaft at operating speeds between 200 RPM and 5000 RPM.

8. An end finisher machine, according to claim 1, including first adjusting means for axially adjusting the position of the stabilizing block assembly and said head assembly relative to said workpiece holder.

9. An end finisher machine, according to claim 8, including second adjusting means for adjusting said mating surface of said head assembly relative to said mating surface of said tooling assembly.

10. An end finisher machine, according to claim 1, wherein said base defines a longitudinally extending guide rail, a first bearing assembly mounted on said guide rail, said first bearing assembly mounting said stabilizing block assembly.

11. An end finisher machine, according to claim 10, including a second bearing assembly mounted on said guide rail, said second bearing assembly mounting said head assembly.

12. An end finisher machine comprising a longitudinally extending base, a longitudinally extending guide rail defined by said base, said guide rail having opposed ends, a workpiece holder mounted adjacent one end of said guide rail, a stabilizing block assembly mounted on said guide rail adjacent the other end, said stabilizing block assembly including a shaft bearing assembly, a rotatable shaft mounted by said shaft bearing assembly and extending toward said workpiece holder, motor means adjacent said stabilizing block assembly for rotating said shaft, said shaft having a distal end, a head assembly mounted along said shaft for axial movement relative to said shaft, said head assembly defining an opening at one end, a tooling assembly mounted on said distal end of said shaft adjacent said head assembly opening, a stop assembly mounted adjacent said workpiece holder, said stop assembly including a pivotal arm movable between a stop position for engaging a workpiece adjacent said tooling assembly and an outer position, said head assembly and said tooling assembly defining mating camming surfaces, wherein axial movement of said head assembly relative to said tooling assembly opens and closes said tooling assembly, a first bearing assembly mounted for movement on said guide rail, said first bearing assembly mounting said stabilizing block assembly, first cylinder means operatively connected to said stabilizing block assembly, a second bearing assembly mounted for movement on said guide rail, said second bearing assembly mounting said head assembly, second cylinder means operatively connected to said head assembly, said tooling assembly including a tooling shaft member fixed to said shaft within said head assembly opening, a plurality of tool holders mounted for radial movement on said tooling shaft member, springs mounted between said tooling shaft member and said tool holders for urging said tool holders radially outwardly, and holding means on said tool holders for holding the tools.

\* \* \* \* \*